Aug. 29, 1950  R. T. DAWES  2,520,533
RIBBON-TYPE PARACHUTE CANOPY
Filed Sept. 2, 1948
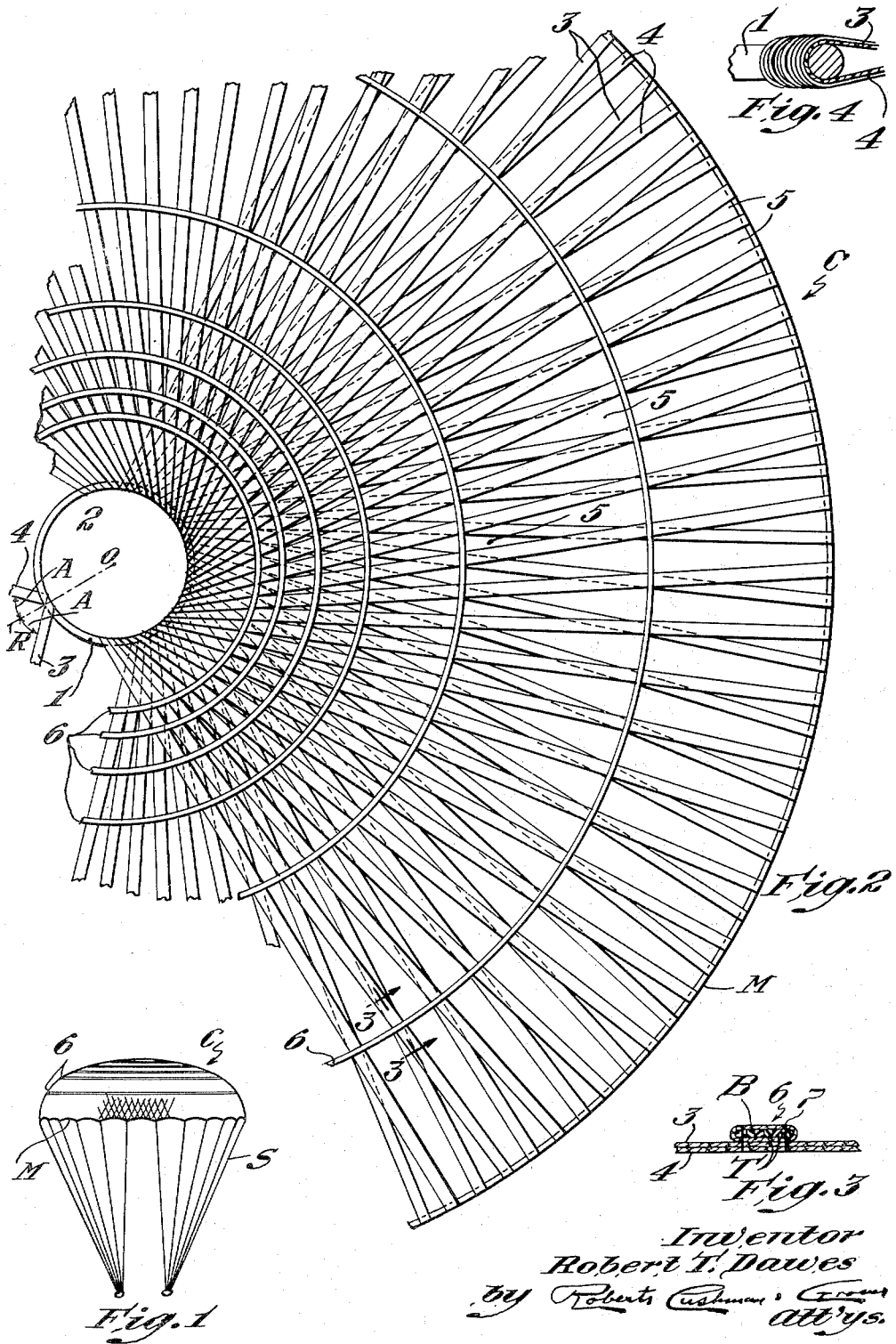
Inventor
Robert T. Dawes Patented Aug. 29, 1950

2,520,533

UNITED STATES PATENT OFFICE 2,520,533

RIBBON-TYPE PARACHUTE CANOPY

Robert T. Dawes, Hudson, Mass.

Application September 2, 1948, Serial No. 47,447

8 Claims. (Cl. 244—145)

This invention pertains to parachutes and more especially to an improved parachute canopy of the ribbon type.

As compared with the conventional parachute canopy, the ribbon-type canopy has certain advantages, in particular its relatively slow opening with consequent less shock to the aviator.

The useful effect of a parachute depends upon the establishment of a suitable unit air pressure against its inner surface resultant from the relative velocity of the canopy and the ambient air. Thus, in order to insure a safe velocity of descent (after the liberated parachute and aviator have assumed the normal descent position in which the axis of the canopy is approximately vertical), it is necessary that the canopy have a very extended surface when fully open, for instance, the customary canopy is of the order of twenty-eight feet in diameter. However, when a parachute is launched from a rapidly moving airplane, the opening of the canopy is not resultant from vertical drop but is almost entirely the result of the high horizontal component of its velocity. At present airplane speeds (approximating the velocity of sound), this horizontal component of velocity, at the instant the parachute is launched, far exceeds the safe velocity of descent (established in accordance with C. A. A. regulations at twenty-one feet per second) so that the conventional canopy, designed to insure a safe velocity of descent, experiences a terrific total pressure force at the instant of opening and, even if strong enough to resist this bursting pressure, subjects the aviator to a sudden shock such as may cause serious injury or even death.

The ribbon-type canopy was developed with the object of lessening the total pressure on the canopy at the instant of opening, thus reducing shock to the aviator. With this in view, the ribbon-type canopy is provided (in addition to the usual large central vent opening) with a multitude of relatively small, narrow vent openings or relief ports distributed more or less uniformly over its entire surface, except for the zone adjacent to the central vent port. The ribbon-type canopy consists of a great number of narrow tapes or ribbons of flexible material (for example, woven textile fabric) which are usually arranged to form upper and lower series. The individual ribbons of each series extend nonradially from the margin of the usual central vent opening to the peripheral edge of the canopy, the center line of each ribbon or tape (assuming the fully opened canopy to be of spherical curvature) defining a circular arc on the surface of a sphere. Each ribbon is inclined at an angle to the radius of the large central vent opening and this angle may vary in different parachutes from 90° (where the ribbon is tangent to the edge of the central vent opening) to a much lesser angle, for example, 45°. The ribbons forming the two series are inclined at opposite but equal angles with reference to a radius of the central vent opening, and adjacent ribbons on each series diverge from the margin of the central vent opening toward the periphery of the canopy so that the space between the edges of adjacent ribbons gradually increases in width. Since the ribbons are of substantial width, for example three inches, there is an overlapping of the ribbons throughout a zone surrounding the central vent opening. Within this zone the canopy is substantially continuous and devoid of vent openings. As the angle of inclination of the ribbons, as above referred to, approaches 90°, this imperforate zone may subtend an arc of 60° at the center of curvature of the spherical surface.

At intervals, hoops of strong, flexible material, usually textile tape, coaxial with the central vent opening, extend around the canopy, crossing the ribbons of the two series to which these hoops are secured at the crossing points, for example, by stitching which passes through the hoops and through the tapes of both upper and lower series. The shrouds, of whatever type employed, are attached in appropriate fashion to the peripheral margin of the canopy.

When such a ribbon parachute is launched, sufficient unit pressure is at once built up against the substantially imperforate zone of the canopy to initiate opening, but since the major portion of the canopy contains a multitude of narrow vent openings or relief ports (between adjacent ribbons), the total effective pressure upon the canopy is much less than though the canopy were of the usual imperforate type and thus opening is very substantially slowed down and shock to the aviator is lessened.

The velocity of normal descent is a function of the effective area of the canopy and of the force of gravity, but in the ribbon-type parachute the effective area at full opening is less than that at some degree of partial opening because the auxiliary escape ports become narrower as the effective periphery of the canopy contracts.

During normal descent the forces tending to expand and to contract the canopy become balanced, but as the weight of the aviator provides the only effective force for collapsing the canopy, the canopy remains extended to a degree such that the auxiliary ports are still quite effective. The result is that the velocity of descent is higher than is safe. Obviously, any attempt at avoiding this result by decreasing the aggregate area of the auxiliary ports at full opening would defeat the purpose of the ribbon-type canopy, to wit, to lessen total pressure at the moment of launching.

Thus, although the ribbon canopy lessens shock in opening, it is unsatisfactory in respect to the velocity of normal descent, for, as commonly constructed, the velocity of descent of the ribbon parachute is in the neighborhood of thirty feet per second, as compared with what is regarded the safe velocity of twenty-one feet per second.

The present invention has for an object the provision of a ribbon-type parachute canopy having the desirable characteristics of slow opening but whose maximum velocity, during normal descent, will not substantially exceed twenty-one feet per second. A further object is to provide a ribbon-type parachute canopy which contracts in effective diameter during normal descent to a greater degree than would result from the weight of the aviator alone. A further object is to provide a ribbon-type parachute canopy whose auxiliary vent ports are automatically reduced in size during normal descent to a degree sufficient to insure a safe velocity. A further object is to provide a ribbon-type parachute canopy including elastically contractible elements so arranged as, during normal descent, to contract the canopy sufficiently to insure a safe velocity of descent. Other and further objects and advantages of the invention will be pointed out in the following more detailed description and by reference to the accompanying drawings wherein:

Fig. 1 is a small scale elevation of a parachute in the position of normal descent and having a canopy which embodies the present invention;

Fig. 2 is a fragmentary plan view, to larger scale, of a canopy of ribbon type showing it fully extended, the canopy embodying the present invention;

Fig. 3 is a fragmentary section, substantially on the line 3—3 of Fig. 2, to larger scale, illustrating the mode of securing the elastic hooks to the canopy ribbons; and Fig. 4 is a fragmentary vertical section, to larger scale than Fig. 2, in a radial plane through the ring which defines the margin of the central vent aperture.

Referring to the drawings, "C" indicates the canopy of a parachute having shrouds S. This canopy is of the ribbon type and may differ from the conventional ribbon-type canopy only in the specific particulars hereinafter pointed out.

Thus, as here illustrated, the canopy comprises a ring 1 of appropriate material, for example, rope or strong, textile fabric, which defines the margin of the large central vent opening 2. The canopy also comprises upper and lower series of ribbons 3 and 4, respectively, which radiate from the ring 1. Preferably, though not necessarily, a ribbon of each series is formed from a single length of material whose midportion bends about the ring 1, the end portions extending from the ring to the peripheral edge of the canopy. Whether or not the ribbons 3 and 4 are portions of a single length of material, the inner ends of the ribbons of both series are firmly secured to the ring 1 in any appropriate way, for example, by stitching. As illustrated, the ribbons 3 and 4 do not lie in radial planes of the canopy but each is inclined to a radius, such as the radius O—R (Fig. 2) so as to make angles A with such a radius. The ribbons of the series 3 are here shown as inclining in an anti-clockwise direction, while those of the series 4 incline in a clockwise direction. The angle A between any given ribbon 3 and the corresponding radius O—R equals the angle made by the corresponding ribbon 4 of the other series, as shown in Fig. 2. The angles A may vary with the particular parachute.

The ribbons of the series 3 and 4 are of substantial width, for example, of the order of three inches, and due to the manner in which they are inclined with respect to radii of the canopy, they overlap in a zone adjacent to the vent opening 2. As the angle A approaches 90°, this overlap may extend outwardly from the ring 1 through a zone of substantial width, for example, a zone which would subtend an arc of 60° or more at the center of the spherical surface defined by the canopy. However, throughout the major portion of the canopy, adjacent ribbons of each series are spaced apart, the ribbons diverging from the ring 1 toward the peripheral edge of the canopy, thus providing a multitude of auxiliary escape passages 5 of various shapes, but in general elongate in radial direction.

While the ribbons 3 and 4 have been described as constituting upper and lower series, this mode of designation has been adopted merely for convenience in description since the ribbons 3 may be interwoven or otherwise concatenated with the ribbons 4.

In order to hold the ribbons properly related, a series of hoops 6 is provided. These hoops are disposed concentrically with reference to the ring 1 and are spaced apart radially. As illustrated, the spacing of the hoops may be progressively greater from the ring 1 toward the peripheral edge of the canopy. The outermost hoop M of these hoops (Fig. 1) may provide anchorage means for the upper ends of the shrouds S. Customarily these hoops 6 are of some flexible material which is substantially inexpansible, for example, of strong, woven textile fabric and of such normal diameters as to permit the canopy to expand fully in response to the air pressure at the moment of opening.

In accordance with the present invention, the hoops 6, instead of being made of substantially inextensible material, are of a construction such that they are highly elastic and capable of great elongation as compared with their normal lengths. For example, such a material may be a tubular textile braid enclosing a core of rubber elastic threads. Thus, as illustrated in Fig. 3, the hoop 6 is made of a tubular, stretchable braid B which encloses several rubber threads T. This braid, with its rubber elastic core, may be made in any desired and customary manner and with a ratio of stretch which may be of the order of one to five, for example. The elastic core must be of such strength as to withstand the stresses to which it is subjected during the descent of the parachute.

These hoops 6 are secured to the ribbons 3 and 4 where they cross the latter, for example, by stitching 7, and, in securing them to the ribbons 3 and 4, the elastic hoops are stretched and held under tension at such an elongation that they permit full opening of the parachute canopy at launching, in the same way as though they were of the usual inextensible material. However, after they have been attached to the ribbons 3 and 4, these elastically stretchable hoops contract, thus exerting a powerful contracting force tending to close the auxiliary passages 5 in the canopy.

With this arrangement, when the parachute is first launched, the internal air pressure extends the canopy in opposition to the elastic contractile force exerted by the hoop 6 to substantially the same extent as though the hoops were of conventional type, but as soon as the parachute assumes the normal position of descent the contractile force of the hoops 6, coupled with the weight of the aviator, effectively decreases the peripheral extent of the canopy, thus narrowing the auxiliary apertures. By designing the parachute so that in this partially closed position it provides the requisite area to insure a safe descent, at a velocity not exceeding 21 ft. per second, the parachute becomes effective for its intended purpose, while at the same time so lessening the total effective pressure at the moment of launching so as to reduce the shock to the aviator to a degree such that it is not injurious. Thus, by the simple expedient of making the hoops 6 of elastic material, the parachute becomes automatic in its response to the pressures which act upon it at different times, exposing a relatively small effective area at the instant of launching but exposing a sufficient area during normal descent to provide the desired support and a safe velocity of descent.

While one desirable embodiment of the invention has herein been illustrated, it is to be understood that the invention is inclusive of any and all modifications, including substitutions of materials and relative arrangements of parts, which fall within the scope of the appended claims.

I claim:

1. A ribbon-type parachute comprising a multitude of ribbons radiating from the margin of a large central vent opening and providing between them relatively small auxiliary vent openings or ports, the vent openings or ports being of progressively increasing size from the margin of the central vent opening to the periphery of the canopy, and means tending to contract said auxiliary vent openings or ports during normal descent to an amount greater than would result solely from the contraction of the canopy by the weight of the aviator.

2. A ribbon-type parachute comprising a multitude of ribbons radiating from the margin of a central vent opening and providing between them a multitude of auxiliary vent openings or ports, the vent openings or ports being of progressively increasing size from the margin of the central vent opening to the periphery of the canopy, and means acting upon the canopy intermediate the central vent opening and the periphery of the canopy normally tending to contract the auxiliary vent openings or ports.

3. A parachute canopy having a large central vent opening, the material of the canopy being substantially imperforate throughout a zone adjacent to the central vent opening but having a multitude of relatively small auxiliary vent openings distributed substantially uniformly throughout the major part of its area, the auxiliary vent openings being of progressively increasing size from the margin of the large central vent opening toward the periphery of the canopy, and elastically contractile means acting upon the canopy intermediate its large central vent opening and its periphery tending to collapse the canopy and thereby to decrease the effective size of the auxiliary vent openings.

4. A parachute canopy having a large central vent opening and a multitude of relatively small auxiliary vent openings distributed over the major portion of the canopy, a series of elastically contractile hoops, coaxial with the central vent opening, said hoops being spaced apart by progressively greater distances from the central vent opening toward the outer edge of the canopy, means securing each hoop to the material of the canopy, the hoops being so designed as to tend to contract the canopy to less than its maximum diameter, the effective area of the partially contracted canopy, during normal descent, being sufficient to insure a safe velocity of descent.

5. A ribbon-type parachute canopy comprising a multitude of ribbons radiating from the margin of a central vent opening and providing between them a multitude of auxiliary vent openings or ports, and a plurality of hoops concentric with the central vent opening, said hoops being spaced apart from each other, and means uniting each hoop to the constituent ribbons of the canopy, said hoops being of flexible, elastically contractible material and tending to contract the canopy.

6. A ribbon-type parachute canopy comprising a multitude of ribbons radiating from the margin of a central vent opening and providing between them auxiliary vent openings or ports, and hoops concentric with the central vent opening, the hoops being spaced apart from each other and being secured to the constituent ribbons of the canopy where they cross said ribbons, the hoops being of flexible, highly elastic material, and, in the fully extended canopy, being substantially elongated and exerting elastic force tending to collapse the canopy.

7. A ribbon-type parachute canopy comprising a multitude of ribbons radiating from the margin of a central vent opening, and a plurality of concentric hoops spaced apart and coaxial with the vent opening, and means uniting the several hoops to the ribbons where they cross the latter, each hoop being of elastically stretchable material and of such normal diameter that when the canopy is fully open said hoops are stretched to greater than normal diameter.

8. A ribbon-type parachute canopy comprising a multitude of ribbons radiating from the margin of a central vent opening, a plurality of concentric hoops spaced apart and coaxial with the vent opening, and means uniting each hoop to the ribbons at the crossing points, each hoop consisting of a stretchable textile tube enclosing a rubber-elastic core, the normal diameter of each hoop being such that when the canopy is fully open the core of the hoop is elongated and exerts a contractile force tending to collapse the canopy.

ROBERT T. DAWES.

REFERENCES CITED

The following references are of record in the file of this patent:

UNITED STATES PATENTS

| Number | Name | Date |
|---|---|---|
| 1,743,951 | Avorio | Jan. 14, 1930 |
| 2,450,926 | Weinig | Oct. 12, 1948 |

FOREIGN PATENTS

| Number | Country | Date |
|---|---|---|
| 827,528 | France | Jan. 28, 1938 |